(12) United States Patent
Azaria et al.

(10) Patent No.: US 11,681,438 B2
(45) Date of Patent: Jun. 20, 2023

(54) MINIMIZING COST OF DISK FULFILLMENT

(71) Applicant: Dell Products, L.P., Round Rock, TX (US)

(72) Inventors: Nadav Azaria, Beer Sheva (IL); Avitan Gefen, Lehavim (IL)

(73) Assignee: DELL PRODUCTS L.P., Round Rock, TX (US)

( * ) Notice: Subject to any disclaimer, the term of this patent is extended or adjusted under 35 U.S.C. 154(b) by 8 days.

(21) Appl. No.: 17/334,523

(22) Filed: May 28, 2021

(65) Prior Publication Data

US 2022/0382456 A1 Dec. 1, 2022

(51) Int. Cl.
| | |
|---|---|
| *G06F 12/00* | (2006.01) |
| *G06F 13/00* | (2006.01) |
| *G06F 3/06* | (2006.01) |
| *G06N 3/04* | (2023.01) |
| *G06Q 10/083* | (2023.01) |

(52) U.S. Cl.
CPC ............ *G06F 3/0605* (2013.01); *G06F 3/067* (2013.01); *G06F 3/0622* (2013.01); *G06F 3/0631* (2013.01); *G06F 3/0683* (2013.01); *G06N 3/04* (2013.01); *G06Q 10/083* (2013.01)

(58) Field of Classification Search
CPC .... G06F 3/0605; G06F 3/0622; G06F 3/0631; G06F 3/067; G06F 3/0683; G06N 3/064; G06O 10/083
USPC .......................................................... 711/154
See application file for complete search history.

(56) References Cited

U.S. PATENT DOCUMENTS

| | | | | |
|---|---|---|---|---|
| 5,719,854 A * | 2/1998 | Choudhury | .............. | H04Q 3/66 370/231 |
| 7,012,771 B1 * | 3/2006 | Asgari | ................... | G11B 27/36 360/48 |
| 7,043,539 B1 * | 5/2006 | Treiber | ................. | H04L 41/082 711/170 |
| 7,765,602 B2 * | 7/2010 | Fujii | .................. | H04N 21/6156 726/19 |
| 7,864,764 B1 * | 1/2011 | Ma | ...................... | H04L 67/5681 370/428 |
| 10,146,449 B1 * | 12/2018 | Labonte | ................ | G06F 3/0632 |
| 10,191,668 B1 * | 1/2019 | Traylor | ................. | G06F 3/0616 |
| 10,210,167 B1 * | 2/2019 | Sorenson, III | .......... | G06F 3/067 |
| 10,355,946 B1 * | 7/2019 | Dolas | .................. | H04L 43/0817 |

(Continued)

*Primary Examiner* — Sheng Jen Tsai
(74) *Attorney, Agent, or Firm* — Amin, Turocy & Watson, LLP

(57) ABSTRACT

A system can determine to produce a storage device for a user identity indicative of a user. The system can determine a number of extra disks to include with the storage device as part of the production, the extra disks enabling further storage capacity for the storage device beyond a specified storage capacity, the determining of the number of extra disks being based on data from a group of data, the group of data comprising first cost data representative of a first cost associated with including the second number of extra disks, probability data representative of a probability that the further storage capacity beyond the specified storage capacity will be requested during a defined time period after the production, and second cost data representative of a second cost associated with installing the second number of extra disks after the storage device has been delivered to the user site.

20 Claims, 11 Drawing Sheets

(56) References Cited

U.S. PATENT DOCUMENTS

| | | | |
|---|---|---|---|
| 10,399,772 B1* | 9/2019 | Brazeau | B65G 1/0492 |
| 10,671,303 B2* | 6/2020 | Cherubini | G06F 3/0611 |
| 10,852,951 B1* | 12/2020 | Dong | G06F 13/1642 |
| 10,936,702 B2* | 3/2021 | Ishimi | G06F 21/10 |
| 11,067,985 B2* | 7/2021 | Kozloski | G05D 1/0223 |
| 2002/0062383 A1* | 5/2002 | Shomler | H04L 63/0823 709/200 |
| 2002/0073283 A1* | 6/2002 | Lewis | G06F 12/121 711/134 |
| 2002/0161855 A1* | 10/2002 | Manczak | G06F 16/183 709/219 |
| 2004/0088478 A1* | 5/2004 | Hall | G11B 5/5547 711/112 |
| 2004/0221060 A1* | 11/2004 | Alicherry | H04L 41/145 709/238 |
| 2005/0210304 A1* | 9/2005 | Hartung | G06F 1/3203 713/320 |
| 2005/0281707 A1* | 12/2005 | Nakaya | G01N 35/00603 422/63 |
| 2007/0198802 A1* | 8/2007 | Kavuri | G06F 11/327 711/170 |
| 2008/0010499 A1* | 1/2008 | Vingralek | G06F 11/008 714/6.11 |
| 2008/0059704 A1* | 3/2008 | Kavuri | G06F 3/061 711/117 |
| 2010/0083120 A1* | 4/2010 | Ito | G06F 3/0689 711/E12.024 |
| 2011/0230994 A1* | 9/2011 | Spearman | G06Q 10/087 700/99 |
| 2012/0079089 A1* | 3/2012 | Lin | H04L 41/0893 709/223 |
| 2012/0185413 A1* | 7/2012 | Felter | G06Q 30/0645 711/E12.001 |
| 2014/0365419 A1* | 12/2014 | Salonidis | G06Q 10/04 706/52 |
| 2015/0006830 A1* | 1/2015 | Shin | G06F 3/0683 711/154 |
| 2015/0378637 A1* | 12/2015 | Takamura | G06F 3/0605 711/114 |
| 2016/0077507 A1* | 3/2016 | Sheble | G06Q 10/06 700/295 |
| 2016/0378519 A1* | 12/2016 | Gaurav | G06F 9/45558 718/1 |
| 2017/0060918 A1* | 3/2017 | Iyer | G06F 3/0665 |
| 2017/0063127 A1* | 3/2017 | Shelton | H02J 7/022 |
| 2017/0244808 A1* | 8/2017 | Sala | H04L 41/142 |
| 2020/0168959 A1* | 5/2020 | Hettrich | H01M 10/6567 |
| 2020/0278799 A1* | 9/2020 | Kumar | G06F 3/0673 |
| 2020/0413321 A1* | 12/2020 | Huntsman | H04W 40/30 |
| 2021/0019116 A1* | 1/2021 | Sun | G06F 7/485 |

\* cited by examiner

400

(402)

SET $Vendor\ Cost(d_{extra}) = \sum_{d_{order}=0}^{\infty} Vendor\ Cost(d_{order}, d_{extra})$ 404

DETERMINE $d_{extra} = argmin_{d_{extra} \in \mathbb{N}} Vendor\ Cost(d_{extra})$ 406

SET $Vendor\ Cost(d_{extra}) = \sum_{m=1}^{CD} \sum_{d=0}^{\infty} Vendor\ Cost(m, d, d_{extra})$ 604

↓

DETERMINE $d_{extra} = argmin_{d \in \mathbb{N}} Vendor\ Cost(d)$ 606

| Months  Disks | 0 | 1 | 2 |
|---|---|---|---|
| 1 | | | |
| 2 | | 20% | 20% |
| 3 | 60% | | |

OBTAIN STORAGE DEVICE PRODUCTION INFORMATION REPRESENTATIVE OF A REQUEST TO PRODUCE A STORAGE DEVICE, THE STORAGE DEVICE COMPRISING A NUMBER OF STORAGE DRIVES BASED ON USER INPUT INDICATING A STORAGE CAPACITY 904

↓

DETERMINE A NUMBER OF EXTRA DISKS TO INCLUDE WITH THE STORAGE DEVICE WHEN THE STORAGE DEVICE IS PRODUCED, THE DETERMINING OF THE NUMBER OF EXTRA DISKS BEING BASED ON AT LEAST ONE OF, A COST ASSOCIATED WITH INCLUDING THE NUMBER OF EXTRA DISKS, A PROBABILITY THAT ADDITIONAL STORAGE CAPACITY BEYOND THE STORAGE CAPACITY WILL BE REQUESTED, OR A COST ASSOCIATED WITH INSTALLING EXTRA DISKS AFTER THE STORAGE DEVICE HAS BEEN DELIVERED 906

↓

STORE AN INDICATION OF THE NUMBER OF EXTRA DISKS IN CONNECTION WITH THE STORAGE DEVICE PRODUCTION INFORMATION 908

MINIMIZING COST OF DISK FULFILLMENT

BACKGROUND

A computer storage device can comprise one or more storage drives. A computer storage device can be used to read, write, and modify computer data.

SUMMARY

The following presents a simplified summary of the disclosed subject matter in order to provide a basic understanding of some of the various embodiments. This summary is not an extensive overview of the various embodiments. It is intended neither to identify key or critical elements of the various embodiments nor to delineate the scope of the various embodiments. Its sole purpose is to present some concepts of the disclosure in a streamlined form as a prelude to the more detailed description that is presented later.

An example system can operate as follows. The system can determine to produce a storage device for a user identity indicative of a user, the storage device to be installed at a user site associated with the user identity after production, the storage device comprising a first number of storage drives based on a specified storage capacity indicated by user input associated with the user identity. The system can further determine a second number of extra disks to include with the storage device as part of the production, the extra disks enabling further storage capacity for the storage device beyond the specified storage capacity, the determining of the second number of extra disks being based on data from a group of data, the group of data comprising first cost data representative of a first cost associated with including the second number of extra disks, probability data representative of a probability that the further storage capacity beyond the specified storage capacity will be requested during a defined time period after the production, and second cost data representative of a second cost associated with installing the second number of extra disks after the storage device has been delivered to the user site. The system can further store an indication of the second number of extra disks.

An example method can comprise obtaining, by a system comprising a processor, storage device production information representative of a request to produce a storage device, the storage device comprising a number of storage drives based on user input indicating a storage capacity. The method can further comprise determining, by the system, a number of extra disks to include with the storage device when the storage device is produced, the determining of the number of extra disks being based on at least one of a cost associated with including the number of extra disks, a probability that additional storage capacity beyond the storage capacity will be requested, or a cost associated with installing extra disks after the storage device has been delivered. The method can further comprise storing, by the system, an indication of the number of extra disks in connection with the storage device production information.

An example non-transitory computer-readable medium can comprise instructions that, in response to execution, cause a system comprising a processor to perform operations. These operations can comprise receiving a production request to produce a storage device associated with a customer identity representative of a customer, the storage device comprising a first number of storage drives based on user input associated with the customer identity indicating a requested amount of storage capacity. These operations can further comprise determining a second number of extra disks to include with the storage device, the determining of the second number of extra disks being based on at least one factor from a group of factors, the group of factors comprising a first cost of including the second number of extra disks, a probability that additional storage capacity beyond the requested amount of storage capacity will be requested via a future request associated with the customer identity, and a second cost of installing the second number of extra disks after the storage device has been delivered to a customer location associated with the customer identity.

BRIEF DESCRIPTION OF THE DRAWINGS

Numerous embodiments, objects, and advantages of the present embodiments will be apparent upon consideration of the following detailed description, taken in conjunction with the accompanying drawings, in which like reference characters refer to like parts throughout, and in which:

FIG. 4 illustrates an example process flow for determining a predicted optimal number of extra disks to include with a storage device that can facilitate minimizing cost of disk fulfillment, in accordance with an embodiment of this disclosure;

FIG. 6 illustrates another example process flow for determining a predicted optimal number of extra disks to include with a storage device that can facilitate minimizing cost of disk fulfillment, in accordance with an embodiment of this disclosure;

FIG. 7 illustrates an example table that represents a distribution that a user will request a particular storage device expansion at a particular time that can facilitate minimizing cost of disk fulfillment, in accordance with an embodiment of this disclosure;

FIG. 9 illustrates another example process flow for minimizing cost of disk fulfillment, in accordance with an embodiment of this disclosure;

DETAILED DESCRIPTION

Overview

Figure 1:
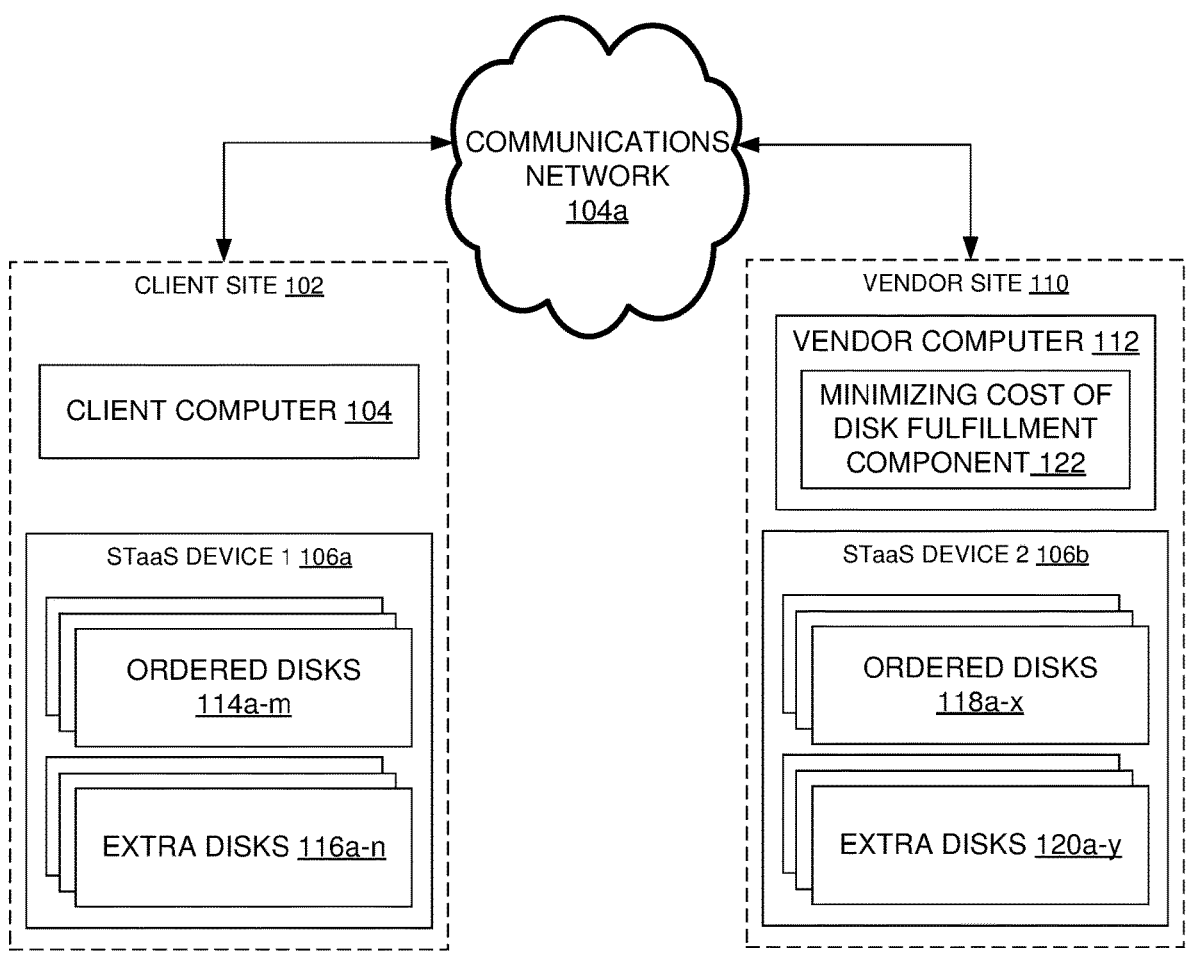
FIG. 1 illustrates an example system architecture that can facilitate minimizing cost of disk fulfillment, in accordance with an embodiment of this disclosure.

A Customers can order computer hardware and software that is installed at a customer's site (which can be referred to as on premises, or on-prem). In some examples, customers pay for this hardware and software in a subscription model to receive a cloud-like experience. An example of this approach can be referred to as "storage as a service" (STaaS), where a customer pays a subscription for storage hardware installed on premises.

In some StaaS examples, a customer states a storage commitment size and a storage buffer size at a time of ordering the STaaS product. This storage commitment can comprise an amount of storage for which the customer pays a fixed price each month (or other time period). This storage buffer size can comprise storage for which the customer pays per use (where the customer does not pay if the customer does not use this storage, and where the price for using the storage can be higher relative to a storage commitment price).

In some examples, a customer can later expand its subscription by enlarging its storage commitment size and/or its storage buffer size. A provider of a STaaS product can anticipate such expansion requests and equip its STaaS product with extra disks (sometimes referred to as orphan disks) that are unused at a time of the original customer order. By providing these extra disks, if a customer later expands its subscription, the provider can activate these already-installed disks, which can be faster and save money relative to sending an employee to a customer site to install the disks.

Yet, if a customer does not expand its order, these extra disks can remain unutilized. This can lead to an optimization problem—what is an optimal number of extra disks that should be shipped with a STaaS product to minimize expansion logistics costs?

A solution to this problem according to the present techniques can be based on a data-driven approach that utilizes customer historical storage usage and purchase history. The present techniques can consider a subscription contract period, a monthly cost of an orphan disk, and a fulfillment cost to determine an optimal number of extra disks to include with a STaaS product.

An example for a customer commitment can be as follows. A storage commitment size can comprise a storage size for which customers pay a fixed monthly subscription. For example, a customer can commit to a storage commitment size of 100 gigabytes (GB), where a price is $0.13 GB/month. That means that a customer will pay $13/month regardless of whether the customer uses this 100 GB capacity or not.

A storage buffer size can comprise a storage size for which the customer pays per use. For example, the customer can request a buffer of 40 GB, for which the customer will pay $0.16 GB/month only for that storage from this buffer that is used during the month.

After placing an initial order, and after delivery of the STaaS product, a customer can update its storage plan. For example, the customer can expand the storage commitment size and/or the storage buffer size of its plan. In some examples, there can be two possibilities where a customer expands its storage plan:

The on-prem STaaS product does not have enough capacity to handle the updated storage plan. A fulfillment process can be performed where an employee of the STaaS product provider can travel to the customer site with extra disks and install them in the STaaS product. This approach can be costly, and less desirable to customers relative to the STaaS product already having the capacity (because it can require time to install, and coordinating with having the employee of the STaaS product provider come onto the customer's premises).

The on-prem storage can already be equipped with enough orphan disks to fulfill the customer's updated order, which can avoid an employee of the STaaS product provider traveling to install new disks.

In some examples, approaches according to the present techniques can comprise two components. One component can be a machine learning (ML) model for predicting customer requests for more storage. Another component can be techniques to find an optimal number of extra disks to ship with each STaaS product.

Some examples can utilize a distribution function, EP(m, d), that indicates a probability that a user will fill an expansion request at month m which requires d new disks. In some examples, EP(m,d) can be determined by considering the entire population. In other examples, a different model can be used, as follows. In order to obtain a distribution function EP(m,d), the following customer data can be used:

Features (X):
History storage usage
Customer information (business category, number of employees, etc.);
Target(Y):
A vector of size (m*d) where there is exactly one element equal to 1 indicating an expansion request happened at month m with d required disks. In some examples, in a case where no expansion event happened, set m=user contract duration, d=0 as 1.

For a machine learning model, a fully-connected neural network can be used, with a softmax and m*d outputs. Training this network can build as a valid EP(m,d). A softmax can generally normalize an input vector z of K real numbers into a probability distribution of K probabilities that are proportional to exponentials of the numbers of the input vector.

According to these present techniques, an optimal number of extra disks to ship with a STaaS product can be determined in order to minimize disk shipment costs. These techniques can take into account a penalty for unused disks, a fulfillment cost, and a contract duration.

Example Architectures

FIG. 1 illustrates an example system architecture 100 that can facilitate minimizing cost of disk fulfillment, in accordance with an embodiment of this disclosure. As depicted, system architecture 100 comprises client site 102, communications network 104a, and vendor site 110.

Client site 102 can comprise one or more physical locations in which a client stores computer hardware, such as a data center, or an office. Client site 102 comprises client computer 104, and STaaS device 1 106a (which comprises ordered disks 114a-m, and extra disks 116a-n).

Vendor site 110 can comprise one or more physical locations in which a vendor of STaaS devices stores computer hardware, such as a data center, or an office. Vendor site 110 comprises vendor computer 112 (which comprises minimizing cost of disk fulfillment component 122), and STaaS device 2 106b (which comprises ordered disks 118a-x, and extra disks 120a-y).

Communications network 104a can comprise a computer communications network, such as the Internet, or an isolated private computer communications network, which can be used for computer communications between client site 102 and vendor site 110.

In some examples, client computer 104 can communicate with vendor computer 112 to order a STaaS device (such as STaaS device 2 106b) to be delivered to client site 102. Client site 102 can use a STaaS device to provide computer data storage services to users of client site 102. In some examples, this type of storage can be referred to as on-prem, and viewed in contrast to cloud storage.

Upon receiving a client request for a new STaaS device, minimizing cost of disk fulfillment component 122 of vendor computer 112 can determine a number of extra disks to include with an ordered STaaS device. For example, minimizing cost of disk fulfillment component 122 can determine a number of ordered disks 118a-x (herein depicted as being x disks, though it can be appreciated that there can be examples with other numbers of disks) for STaaS device 2 106b. The number of ordered disks can provide a storage capacity specified by the client order. Minimizing cost of disk fulfillment component 122 can also determine a number of extra disks 120a-y (herein depicted as being y disks, though it can be appreciated that there can be examples with other numbers of disks) for STaas device 2 106b. These can be disks that are not part of the initial storage capacity specified by the client order, but which can be activated to provide additional storage capacity should the client change its order to have more capacity.

STaaS device 1 106a can be similar to STaaS device 2 106b. A difference between STaaS device 1 106a and STaaS device 2 106b can be that STaaS device 1 106a is installed at client site 102, while STaaS device 2 106b is located at vendor site 110 (possibly while being assembled).

Figure 8:
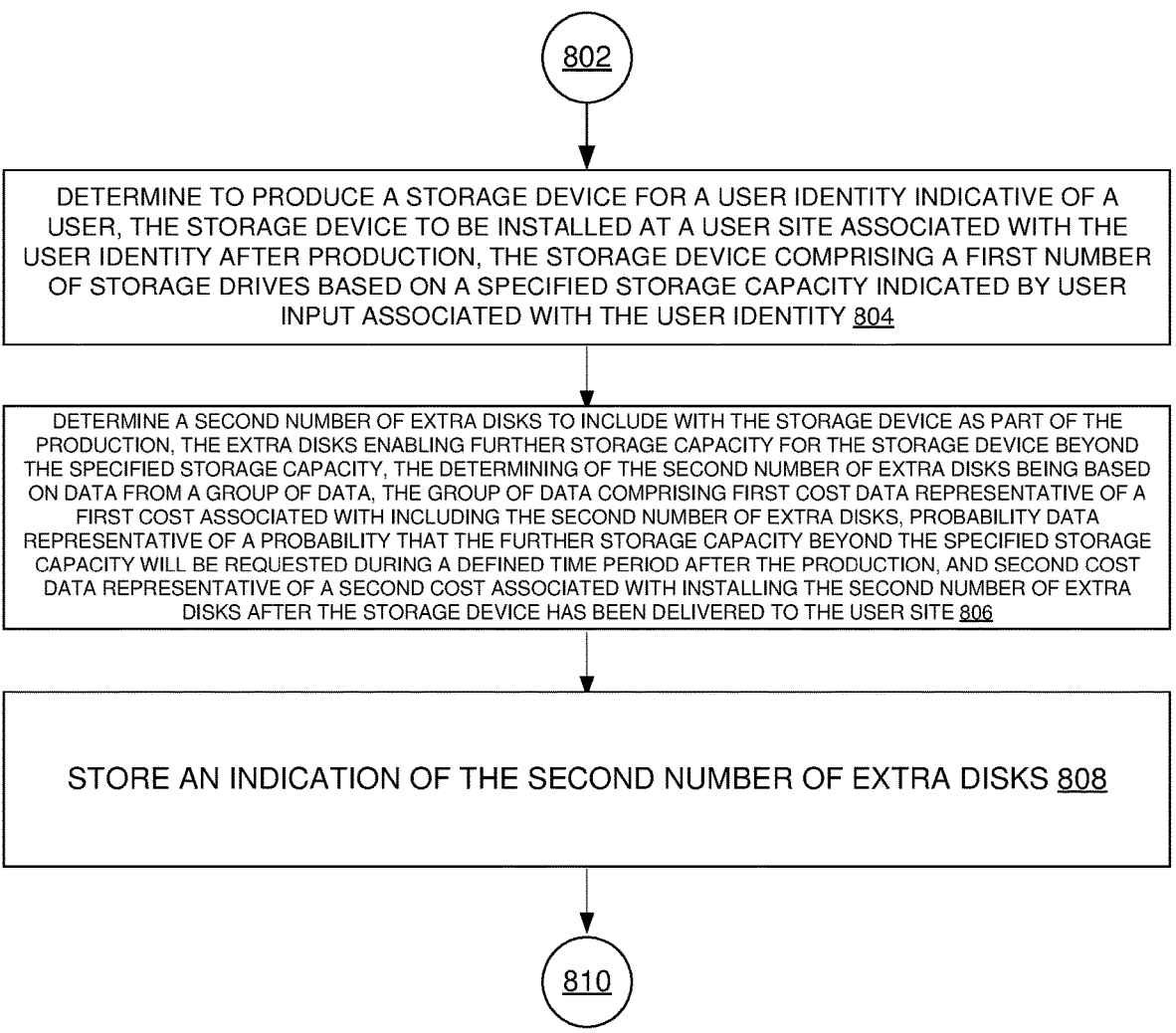
FIG. 8 illustrates an example process flow for minimizing cost of disk fulfillment, in accordance with an embodiment of this disclosure.
Figure 10:
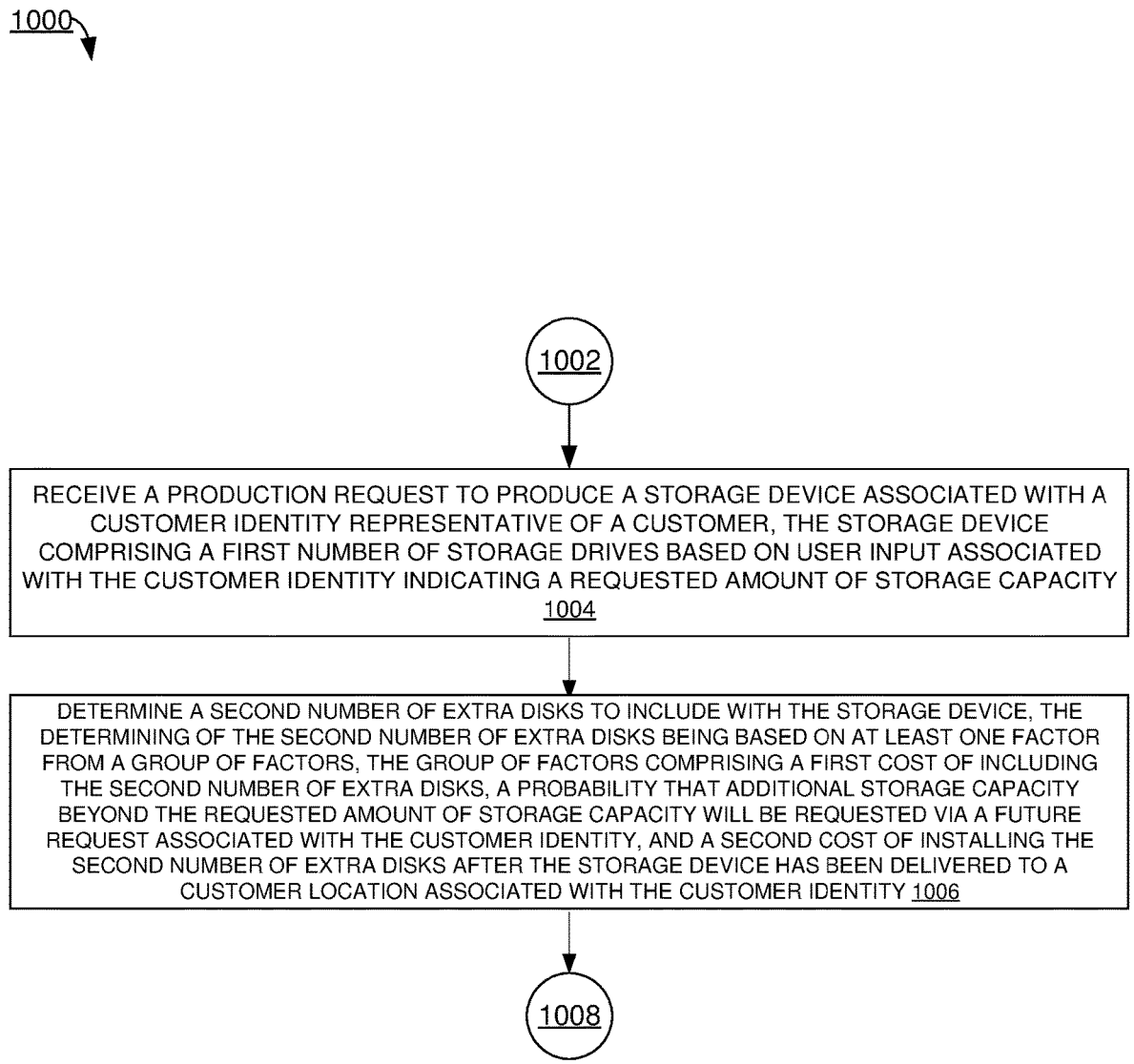
FIG. 10 illustrates another example process flow for minimizing cost of disk fulfillment, in accordance with an embodiment of this disclosure.

In implementing minimizing cost of disk fulfillment, minimizing cost of disk fulfillment component 122 can implement part(s) of process flow 800 of FIG. 8, process flow 900 of FIG. 9, and/or process flow 1000 of FIG. 10. In some examples minimizing cost of disk fulfillment component 122 can be implemented with machine-executable instructions and/or part(s) of computer 1102 of FIG. 11.

Figure 11:
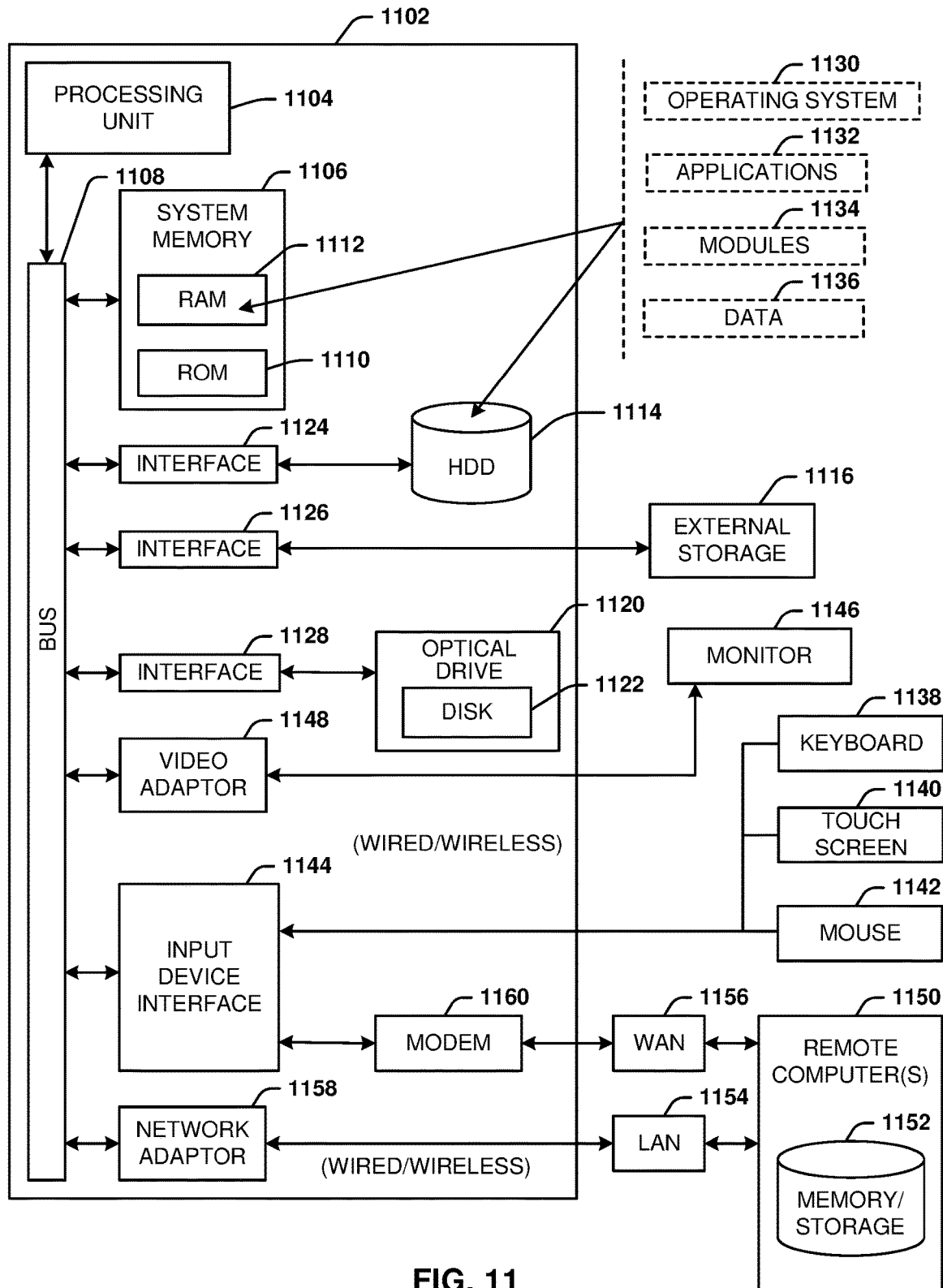
FIG. 11 illustrates an example block diagram of a computer operable to execute an embodiment of this disclosure.

In some examples, each of client computer 104, STaaS device 1 106a, STaaS device 2 106b, and/or vendor computer 112 can be implemented with one or more instances of computer 1102 of FIG. 11.

Figure 2:
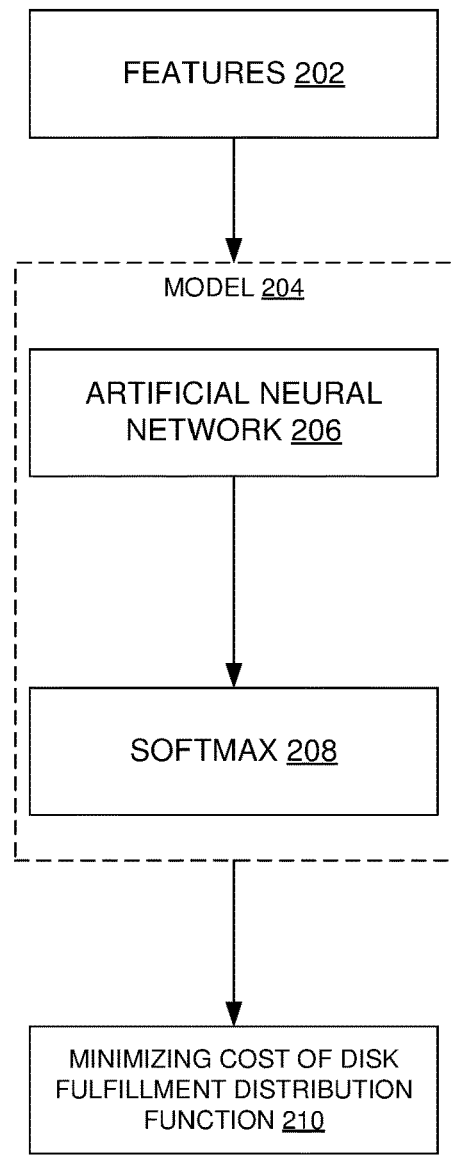
FIG. 2 illustrates an example system architecture for machine learning that can facilitate minimizing cost of disk fulfillment, in accordance with an embodiment of this disclosure.

FIG. 2 illustrates an example system architecture 200 for machine learning that can facilitate minimizing cost of disk fulfillment, in accordance with an embodiment of this disclosure. In some examples, system architecture 200 can be used to implement minimizing cost of disk fulfillment component 122 of FIG. 1. In some examples, system architecture can be implemented with computer 1102 of FIG. 11.

System architecture comprises customer and order features 202, model 204, and minimizing cost of disk fulfillment distribution function 210. In turn, model 204 comprises artificial neural network 206, and softmax 208.

Customer and order features 202 can be used as an input to model 204. Customer and order features 202 can comprise information about the customer placing the order (e.g., a customer entity associated with client site 102 of FIG. 1). Customer and order features 202 can include information such as a history of the customer's storage unit, and customer information such as the customer's business category, and a number of employees who work for the customer.

Artificial neural network 206 can receive customer and order features 202 as input, and from that input, output a vector of size (m*d) where there is one element equal to 1 indicating an expansion request happened at month m with d required disks. In some examples, where no expansion event happens, the element m=contract duration, d=0 can be equal to 1.

This output of artificial neural network 206 can be received by softmax 208. Softmax 208 can serve as an activation function to normalize an output of artificial neural network 206 to a probability distribution over predicted output classes. Softmax 208 can take its input and from it produce minimizing cost of disk fulfillment distribution function 210. In some examples, minimizing cost of disk fulfillment distribution function 210 can be similar to EP( ) described herein as a distribution function that yields a probability that a customer will fill an expansion request which requires exactly $d_{order}$ new disks.

Minimizing cost of disk fulfillment component 122 of FIG. 1 can use this output, minimizing cost of disk fulfillment distribution function 210, to determine how many extra disks (e.g., extra disks 120a-y) to include with a STaaS device (e.g., STaaS device 2 106b).

Example Process Flows and Tables

Figure 3:
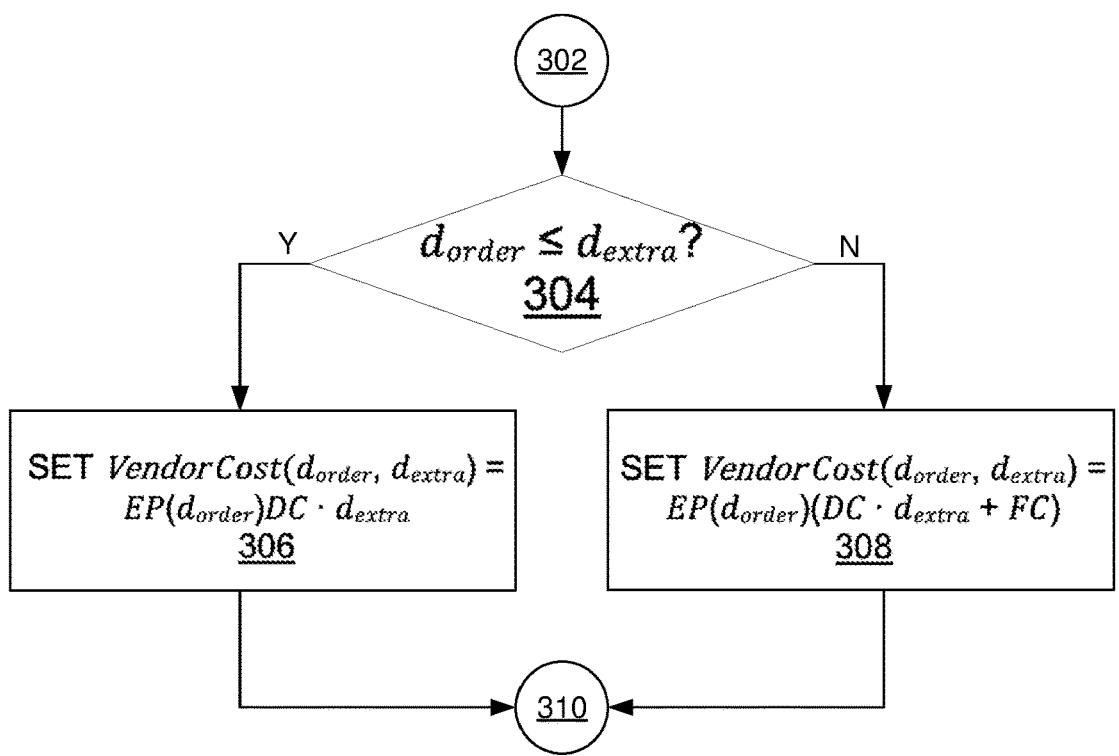
FIG. 3 illustrates an example process flow for determining a predicted cost of including a given number of extra disks with a storage device that can facilitate minimizing cost of disk fulfillment, in accordance with an embodiment of this disclosure.

FIG. 3 illustrates an example process flow 300 for determining a predicted cost of including a given number of extra disks with a storage device that can facilitate minimizing cost of disk fulfillment, in accordance with an embodiment of this disclosure. In some examples, one or more embodiments of process flow 300 can be implemented by minimizing cost of disk fulfillment component 122 of FIG. 1, or computing environment 1100 of FIG. 11.

It can be appreciated that the operating procedures of process flow 300 are example operating procedures, and that there can be embodiments that implement more or fewer operating procedures than are depicted, or that implement the depicted operating procedures in a different order than as depicted. In some examples, process flow 300 can be implemented in conjunction with one or more embodiments of one or more of process flow 400 of FIG. 4, process flow 500 of FIG. 5, process flow 600 of FIG. 6, process flow 800 of FIG. 8, process flow 900 of FIG. 9 and/or process flow 1000 of FIG. 10.

With respect to process flow 300, the following terms can be used. EP ($d_{order}$)—A distribution function that yields a probability that a customer will fill an expansion request which requires exactly $d_{order}$ new disks. Thus, EP satisfies:

$$\sum_{d=0}^{\infty} EP(d_{order}) = 1$$

where the probability of no expansion event can be obtained by EP(0).

FC(cu)—A function that yields a cost of shipping and installing extra disks at customer cu. This can be assumed to be a constant for a given customer. In other examples, FC( ) can be parameterized. FC( ) can also represent additional costs caused by a fulfillment request.

DC—A constant cost of a penalty for a single extra disk. Rather than being the cost of the disk itself, this can represent a penalty for the disk being installed before it is needed, or when it is not needed. In the simplified approach, a constant penalty can be applied. In the second approach, a disk cost can be used that is dependent on its idle duration; this approach can be more accurate in some examples.

CD—A contract duration in number of months. In some examples, this can be 12 or 36 months.

Vendor Cost—An expansion request essentially can indicate that a customer needs more disks. The term "vendor cost" here can refer to a cost of getting those extra disks to the costumer. In some examples this can be done up front, or on request.

Process flow 300 begins with 302, and moves to operation 304. Operation 304 depicts determining whether $d_{order} \leq d_{extra}$. Where it is determined in operation 304 that $d_{order} \leq d_{extra}$, process flow 300 moves to operation 306. Instead, where it is determined in operation 304 that $d_{order} > d_{extra}$ (that is, that $d_{order} \leq d_{extra}$ is false), process flow 300 moves to operation 308.

Operation 306 is reached from operation 304 where it is determined in operation 304 that $d_{order} \leq d_{extra}$. Operation 306 depicts setting Vendor Cost($d_{order}$, $d_{extra}$)=EP($d_{order}$) DC·$d_{extra}$. After operation 306, process flow 300 moves to 308, where process flow 300 ends.

Operation 308 is reached from operation 304 where it is determined in operation 304 that $d_{order} > d_{extra}$. Operation 308 depicts setting Vendor Cost($d_{order}$, $d_{extra}$)=EP($d_{order}$) (DC·$d_{extra}$+FC). After operation 306, process flow 300 moves to 308, where process flow 300 ends.

That is, in an example where the STaaS product is shipped with $d_{extra}$ disks, and an expansion event accrues with a need of $d_{order}$ new disks, then the vendor cost can be modeled as:

If $d_{order} \leq d_{extra}$:

Vendor Cost($d_{order}$,$d_{extra}$)=EP($d_{order}$)DC·$d_{extra}$

If $d_{order} > d_{extra}$:

Vendor Cost($d_{order}$,$d_{extra}$)=EP($d_{order}$)(DC·$d_{extra}$+FC)

A result of implementing process flow 300 can be to produce a Vendor Cost function that can be used in process flow 400 of FIG. 4 to determine a number of extra disks (e.g., extra disks 120a-y of FIG. 1) to include with a STaaS device (e.g., STaaS device 2 106b) to fulfill a customer order (e.g., a customer entity associated with client site 102). Determining a number of extra disks in this manner can be implemented in order to minimize a predicted cost to the vendor associated with the STaaS device.

FIG. 4 illustrates an example process flow 400 for determining a predicted optimal number of extra disks to include with a storage device that can facilitate minimizing cost of disk fulfillment, in accordance with an embodiment of this disclosure. In some examples, one or more embodiments of process flow 400 can be implemented by minimizing cost of disk fulfillment component 122 of FIG. 1, or computing environment 1100 of FIG. 11.

It can be appreciated that the operating procedures of process flow 400 are example operating procedures, and that there can be embodiments that implement more or fewer operating procedures than are depicted, or that implement the depicted operating procedures in a different order than as depicted. In some examples, process flow 400 can be implemented in conjunction with one or more embodiments of one or more of process flow 300 of FIG. 3, process flow 500 of FIG. 5, process flow 600 of FIG. 6, process flow 800 of FIG. 8, process flow 900 of FIG. 9 and/or process flow 1000 of FIG. 10.

Process flow 400 begins with 402 and moves to operation 404. Operation 404 depicts setting Vendor Cost($d_{extra}$)= $\Sigma_{d_{order}=0}^{\infty}$Vendor Cost($d_{order}$,$d_{extra}$). The particular Vendor Cost used can be determined by implementing process flow 300 of FIG. 3. After operation 404, process flow 400 moves to operation 406.

Operation 406 depicts determining $d_{extra}$=argmin$_{d_{extra} \in \mathbb{N}}$ Vendor Cost($d_{extra}$). A result of performing operation 406 can be to determine a number of extra disks ($d_{extra}$) to include with a STaaS device (e.g., STaaS device 2 106b of FIG. 1). After operation 406, process flow 400 moves to 408, where process flow 400 ends.

A goal of implementing process flow 400 can be to find $d_{extra}$ such that Vendor Cost($d_{extra}$) is minimal where, $$\text{Vendor Cost}(d_{extra}) = \sum_{d_{order}=0}^{\infty} \text{Vendor Cost}(d_{order}, d_{extra})$$

Since a number of disks can be a discrete parameter, this can be evaluated by enumerating over a reasonable number of disks, where the reasonable number of disks can be a predefined parameter that is set by an administrator of a system that implements these techniques. So, $$d_{extra} = \text{argmin}\, n_{d_{extra} \in \mathbb{N}} \text{ Vendor Cost}(d_{extra})$$

In various examples, different approaches can be taken to generate EP(d) for a specific contract duration. One approach can be to consider an entire population with segmentation of storage size and business category. For example, given a customer from category Y who orders storage with size X, a history of orders that match Y and X can be analyzed to determine statistics on disk expansion.

In some examples, a more complex model can be used to obtain better personalization. Data for the model can comprise a collection of vectors in the form, customer features→requested extra disks during contract duration Customer features can include information such as storage usage, customer business category, and number of employees.

A requested number of extra disks can be viewed as categories. A neural network (or other machine learning techniques) can be implemented to perform a classification using the data. Training such a model can generate a valid EP(d) distribution function, due to a Softmax activation function at a last layer of the neural network.

Consider the following example. A customer, Customer, can have ordered a STaaS product for 12 months. Let the following probabilities exist:

EP(0)=40%—a probability that Customer will not issue an expansion in the next 12 months.
EP(1)=30%—a probability that Customer will issue an expansion with 1 extra disk needed.
EP(2)=20%—a probability that Customer will issue an expansion with 2 extra disk needed.
EP(3)=10%—a probability that Customer will issue an expansion with 3 extra disk needed.
CD=12 months
DC=$10
FC(Customer)=$20

Then, the following question can be addressed: how many extra disks should the STaaS product be shipped with to minimize an average vendor cost. Vendor Cost(X) can be determined for each of the four disk scenarios—the customer will not request expansion; the customer will request expansion that involves one additional disk; the customer will request expansion that involves two additional disks; and the customer will request expansion that involves three additional disks. These four scenarios can be determined as follows:

Average Vendor Cost if no extra disks are included in the STaaS product: Dell Cost(0)=Dell Cost(0,0)+Dell Cost(1,0)+Dell Cost(2,0)+Dell Cost(3,0)=EP(0)*DC*0+EP(1)*(DC*0+FC)+EP(2)*(DC*0+FC)+EP(3)*(DC*0+FC)= 40%*10*0+30%*20+20%*20+10%*20=$12

Average Vendor Cost if one extra disk is included in the STaaS product: Dell Cost(1)=Dell Cost(0,1)+Dell Cost(1,1)+Dell Cost(2,1)+Dell Cost(3,1)=EP(0)*DC*1+EP(1)*DC*1+EP(2)*(DC*1+FC)+EP(3)*(DC*1+FC)= 40%*10*1+30%*10+20%*30+10%*30=$16

Average Vendor Cost if two extra disks are included in the STaaS product: Dell Cost(2)=Dell Cost(0,2)+Dell Cost(1,2)+Dell Cost(2,2)+Dell Cost(3,2)=EP(0)*DC*2+EP(1)*DC*2+EP(2)DC*2+EP(3)*(DC*2+FC)=40%*10*2+ 30%*20+20%*20+10%*40=$22

Average Vendor Cost if three extra disks are included in the STaaS product: Dell Cost(3)=Dell Cost(0,3)+Dell Cost(1,3)+Dell Cost(2,3)+Dell Cost(3,3)=EP(0)*DC*3+EP(1)*DC*3+EP(2)DC*3+EP(3)DC*3=40%*10*3+30%*30+ 20%*30+10%*30=$30

Then, the following can be applied:

$$d_{extra} = \text{argmin}_{d_{extra} \in \mathbb{N}} \text{ Vendor Cost}(d_{extra})$$

This can provide an answer for, given the above, determining which $d_{extra}$ gives a lowest Vendor Cost. In this example, the answer is $d_{extra}=0$, which can indicate that a predicted best strategy for this customer is not to include any extra disks with the STaaS product. The $d_{extra}$ gives a lowest Vendor Cost can be used to select a number of extra disks (e.g., extra disks 120a-y of FIG. 1) to include with a STaaS device (e.g., STaaS device 2 106b) to fulfill a customer order (e.g., a customer entity associated with client site 102) to minimize a predicted vender cost.

Figure 5:
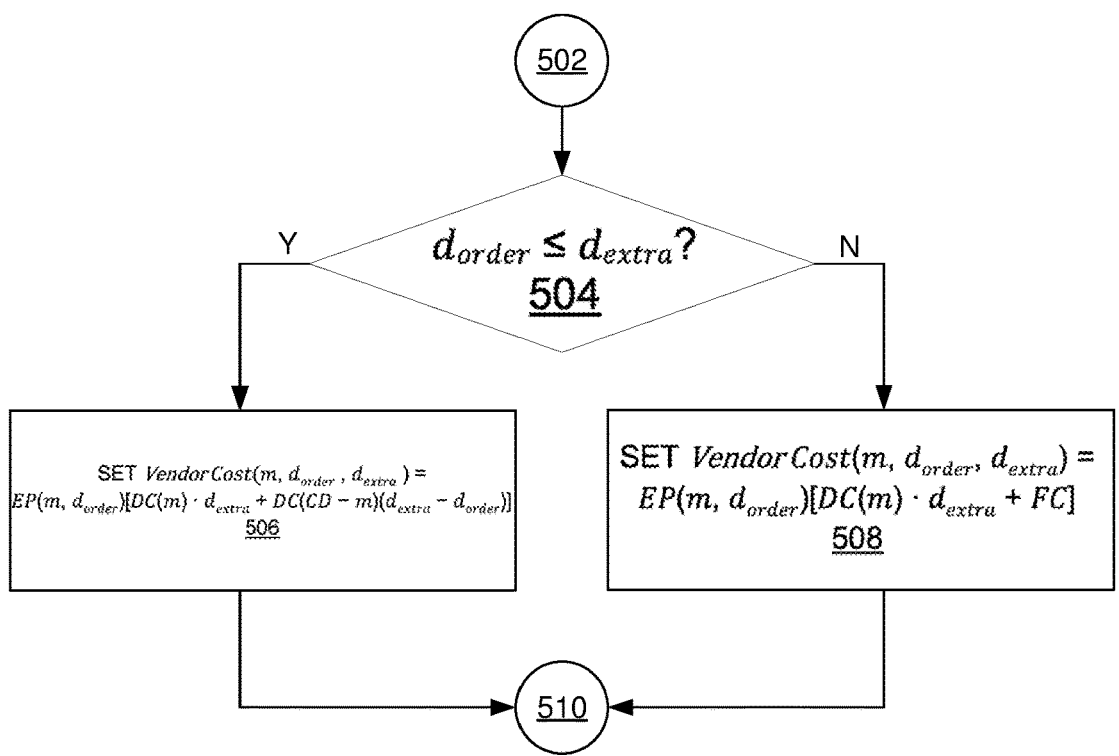
FIG. 5 illustrates another example process flow for determining a predicted cost of including a given number of extra disks with a storage device that can facilitate minimizing cost of disk fulfillment, in accordance with an embodiment of this disclosure.

FIG. 5 illustrates another example process flow 500 for determining a predicted cost of including a given number of extra disks with a storage device that can facilitate minimizing cost of disk fulfillment, in accordance with an embodiment of this disclosure. In some examples, one or more embodiments of process flow 500 can be implemented by minimizing cost of disk fulfillment component 122 of FIG. 1, or computing environment 1100 of FIG. 11.

It can be appreciated that the operating procedures of process flow 500 are example operating procedures, and that there can be embodiments that implement more or fewer operating procedures than are depicted, or that implement the depicted operating procedures in a different order than as depicted. In some examples, process flow 500 can be implemented in conjunction with one or more embodiments of one or more of process flow 300 of FIG. 3, process flow 400 of FIG. 4, process flow 600 of FIG. 6, process flow 800 of FIG. 8, process flow 900 of FIG. 9 and/or process flow 1000 of FIG. 10.

In some examples, process flow 500 can be viewed relative to process flow 300 of FIG. 3. Relative to process flow 300 of FIG. 3, process flow 500 can generally involve a more complex approach, which supports a variant cost of disks. In a model according to this example, extra disk cost can be a function of a duration that the extra disk resides at a customer site. In some examples, this can provide for a more realistic model compared to the approach of process flow 300 of FIG. 3.

The following terms can be used regarding process flow 500: EP(m, d)—A distribution function that yields a probability a customer will fill an expansion request at month m that requires d new disks. Thus, EP satisfies:

$$\sum_{m=1}^{\infty} \sum_{d=1}^{\infty} EP(m, d) = 1$$

A probability of no expansion event at all can be obtained by:

$$\sum_{m=1}^{\infty} EP(m, 0)$$

FC(cu)—A function that yields a cost of shipping and installing extra disks at customer cu. For readability in this example, it can be assumed that this is a constant for a given customer. In some examples, FC can be extended to be parameterized.

DC(m)—A function that yields a cost of an unused disk for m months.

CD—Contract duration in number of months. In some examples, this can have a value of 12 or 36.

Vendor Cost—This can refer to a cost of providing extra disks to a customer in response to a customer's expansion request. This can be done upfront, where the disks are installed in a STaaS product before being delivered to a customer site. This can also be done on request, where disks are installed in a STaaS product that has already been delivered to a customer site.

Process flow 500 begins with 502, and moves to operation 504. Operation 504 depicts determining whether $d_{order} \leq d_{extra}$. Where it is determined in operation 504 that $d_{order} \leq d_{extra}$, process flow 500 moves to operation 506. Instead, where it is determined in operation 504 that $d_{order} > d_{extra}$ (that is, that $d_{order} \leq d_{extra}$ is false), process flow 500 moves to operation 508.

Operation 506 is reached from operation 504 where it is determined in operation 504 that $d_{order} \leq d_{extra}$. Operation 506 depicts setting Vendor Cost(m, $d_{order}$, $d_{extra}$)=EP(m, $d_{order}$)[DC(m)·$d_{extra}$+DC(CD−m)($d_{extra}$−$d_{order}$)] After operation 506, process flow 500 moves to 508, where process flow 500 ends.

Operation 508 is reached from operation 504 where it is determined in operation 304 that $d_{order} > d_{extra}$. Operation 508 depicts setting Vendor Cost(m, $d_{order}$, $d_{extra}$)=EP(m, $d_{order}$)[DC(m)·$d_{extra}$+FC]. After operation 506, process flow 500 moves to 508, where process flow 500 ends.

That is, if a STaaS product is shipped with $d_{extra}$ extra disks, and an expansion event accrues at month m with $d_{order}$ disks, then the Vendor Cost can be modeled as:

If $d_{order} \leq d_{extra}$:

Vendor Cost(m,$d_{order}$,$d_{extra}$)=EP(m,$d_{order}$)[DC(m) ·$d_{extra}$+DC(CD−m)($d_{extra}$−$d_{order}$)]

If $d_{order} > d_{extra}$:

Vendor Cost(m,$d_{order}$,$d_{extra}$)=EP(m,$d_{order}$)[DC(m) ·$d_{extra}$+FC]

A result of implementing process flow 500 can be to produce a Vendor Cost function that can be used in process flow 600 of FIG. 6 to determine a number of extra disks (e.g., extra disks 120a-y of FIG. 1) to include with a STaaS device (e.g., STaaS device 2 106b) to fulfill a customer order (e.g., a customer entity associated with client site 102). Determining a number of extra disks in this manner can be implemented in order to minimize a predicted cost to the vendor associated with the STaaS device.

FIG. 6 illustrates another example process flow 600 for determining a predicted optimal number of extra disks to include with a storage device that can facilitate minimizing cost of disk fulfillment, in accordance with an embodiment of this disclosure. In some examples, one or more embodiments of process flow 600 can be implemented by minimizing cost of disk fulfillment component 122 of FIG. 1, or computing environment 1100 of FIG. 11.

It can be appreciated that the operating procedures of process flow 600 are example operating procedures, and that there can be embodiments that implement more or fewer operating procedures than are depicted, or that implement the depicted operating procedures in a different order than as depicted. In some examples, process flow 600 can be implemented in conjunction with one or more embodiments of one or more of process flow 300 of FIG. 3, process flow 400 of FIG. 4, process flow 500 of FIG. 5, process flow 800 of FIG. 8, process flow 900 of FIG. 9 and/or process flow 1000 of FIG. 10.

Similar to the contrast between process flow 500 of FIG. 5 and process flow 300 of FIG. 3, in some examples, process flow 600 can be viewed relative to process flow 400 of FIG. 4. Relative to process flow 400 of FIG. 4, process flow 400 can generally involve a more complex approach, which supports a variant cost of disks. In a model according to this example, extra disk cost can be a function of a duration that the extra disk resides at a customer site. In some examples, this can provide for a more realistic model compared to the approach of process flow 400 of FIG. 4.

Process flow 600 begins with 602 and moves to operation 604. Operation 604 depicts setting Vendor Cost($d_{extra}$)= $\sum_{m=1}^{CD} \sum_{d=0}^{\infty}$ Vendor Cost(m, d, $d_{extra}$). The particular Vendor Cost used can be determined by implementing process flow 300 of FIG. 3. After operation 604, process flow 600 moves to operation 606.

Operation 606 depicts determining $d_{extra}$=argmin $_{d_{extra} \in \mathbb{N}}$ Vendor Cost(d). A result of performing operation 606 can be to determine a number of extra disks ($d_{extra}$) to include with a STaaS device (e.g., STaaS device 2 106b of FIG. 1). After operation 606, process flow 600 moves to 608, where process flow 600 ends.

That is, with process flow 600, a goal can be to find $d_{extra}$ such that Vendor Cost($d_{extra}$) is minimal where, $$\text{Vendor Cost } (d_{extra}) = \sum_{m=1}^{CD} \sum_{d=0}^{\infty} \text{Vendor Cost } (m, d, d_{extra})$$

Since a number of disks can be a discrete parameter, this can be evaluated by enumerating over a reasonable number of disks, where the reasonable number of disks can be a predefined parameter that is set by an administrator of a system that implements these techniques. So, $$d_{extra} = \text{argmin}^{d_{extra} \in \mathbb{N}} \text{ Vendor Cost}(d)$$

This can provide an answer for, given the above, determining which $d_{extra}$ gives a lowest Vendor Cost. The $d_{extra}$ gives a lowest Vendor Cost can be used to select a number of extra disks (e.g., extra disks 120a-y of FIG. 1) to include with a STaaS device (e.g., STaaS device 2 106b) to fulfill a customer order (e.g., a customer entity associated with client site 102) to minimize a predicted vender cost.

Figure 7:
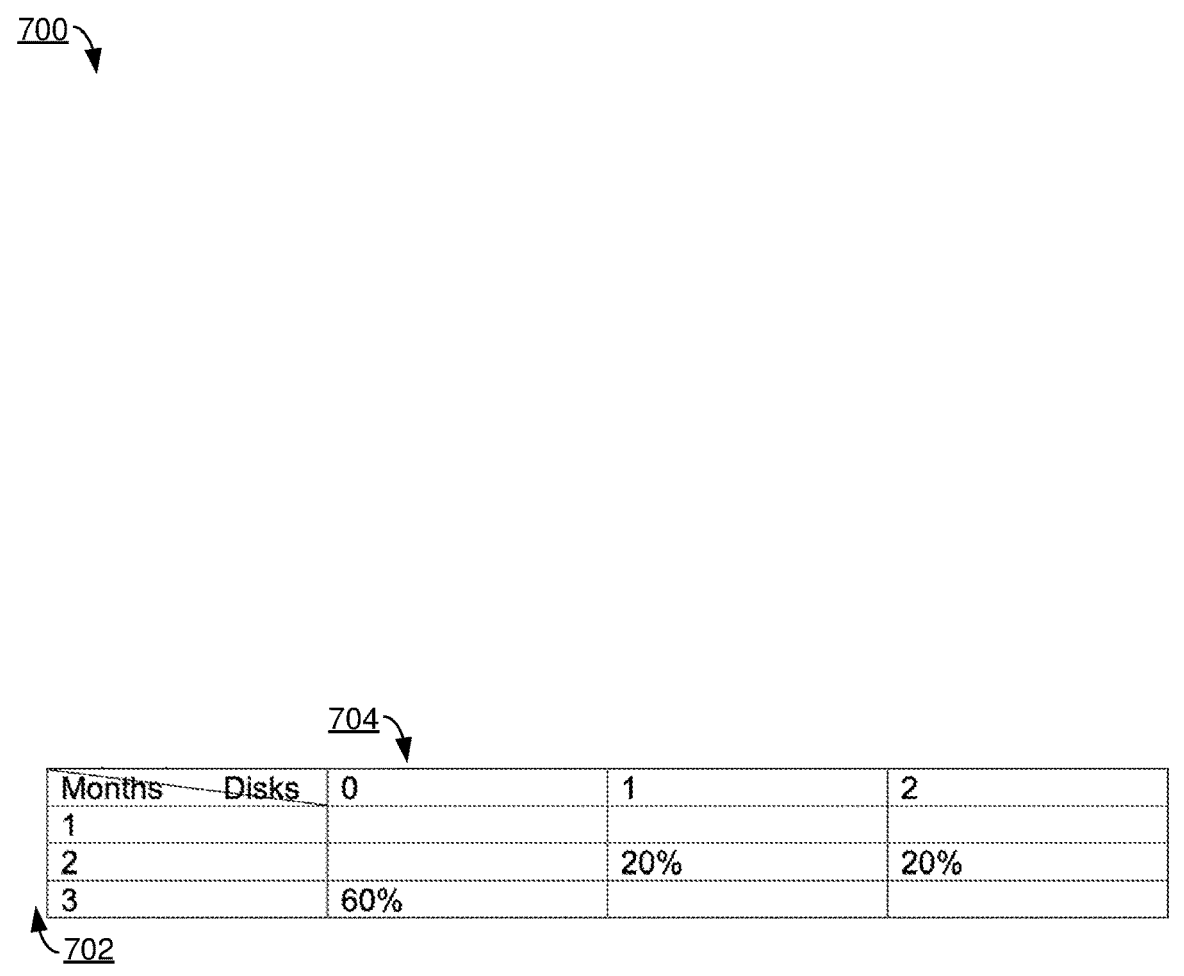

FIG. 7 illustrates an example table 700 that represents a distribution that a user will request a particular storage device expansion at a particular time that can facilitate minimizing cost of disk fulfillment, in accordance with an embodiment of this disclosure. In some examples, table 700 can be produced by implementing process flow 400 of FIG. 4 and/or process flow 600 of FIG. 6, and represent the output of distribution function EP(m, d) as described with respect to those process flows.

Table 700 comprises rows 702 and columns 704. Rows 702 identify a particular month since a STaaS device is provided to a customer site. Columns 704 indicates a number of extra disks ordered by a customer entity. For example, according to the example of table 700, there is a predicted 60% chance that the customer entity will not order any additional disks, a 20% chance that the customer entity will order one additional disk in month 2, and a 20% chance that the customer entity will order two additional disks in month 2. Note that these probabilities sum to 100%.

From table 700 (or a corresponding EP( ) function), a number of extra disks to be included with the STaaS device can be determined. In this example, let the following be true:

FC(cu)=$100
DC(m)=$20/month
CD=3 months

Then, the following can be determined:
Vendor Cost(2,1,3)=20%[3*20*1+1*2*20]=$20
Vendor Cost(2,2,3)=20%[3*20*2+1*1*20]=$28
Vendor Cost(3,0,3)=60%[3*20]=$36

This means that the average cost for the provider of the STaaS product of taking the strategy of three extra disks would be $84.

Vendor Cost(2,1,0)=20%[100]=$20
Vendor Cost(2,2,0)=20%[100]=$20
Vendor Cost(3,0,0)=60%[100]=$60

This means that the average cost for provider of the STaaS product of taking the strategy of zero extra disks would be $100.

So, the strategy of delivering the STaaS product with three extra disks is projected to save money (on average) compared to a strategy of delivering the STaaS product with no extra disks.

FIG. 8 illustrates an example process flow 800 for minimizing cost of disk fulfillment, in accordance with an embodiment of this disclosure. In some examples, one or more embodiments of process flow 800 can be implemented by minimizing cost of disk fulfillment component 122 of FIG. 1, or computing environment 1100 of FIG. 11.

It can be appreciated that the operating procedures of process flow 800 are example operating procedures, and that there can be embodiments that implement more or fewer operating procedures than are depicted, or that implement the depicted operating procedures in a different order than as depicted. In some examples, process flow 800 can be implemented in conjunction with one or more embodiments of one or more of process flow 300 of FIG. 3, process flow 400 of FIG. 4, process flow 500 of FIG. 5, process flow 600 of FIG. 6, process flow 900 of FIG. 9 and/or process flow 1000 of FIG. 10.

Process flow 800 begins with 802, and moves to operation 804. Operation 804 depicts determining to produce a storage device for a user identity indicative of a user, the storage device to be installed at a user site associated with the user identity after production, the storage device comprising a first number of storage drives based on a specified storage capacity indicated by user input associated with the user identity.

After operation 806, process flow 800 moves to operation 808.

Operation 806 depicts determining a second number of extra disks to include with the storage device as part of the production, the extra disks enabling further storage capacity for the storage device beyond the specified storage capacity, the determining of the second number of extra disks being based on data from a group of data, the group of data comprising first cost data representative of a first cost associated with including the second number of extra disks, probability data representative of a probability that the further storage capacity beyond the specified storage capacity will be requested during a defined time period after the production, and second cost data representative of a second cost associated with installing the second number of extra disks after the storage device has been delivered to the user site.

In some examples, the probability is a first probability. In such examples, operation 806 can comprise determining the first probability that the further storage capacity will be requested based on a distribution function that outputs a second probability that an expansion request will be filled at a particular time period, variable as a first parameter of the distribution function, involving a number of new disks variable as a second parameter of the distribution function. That is, an EP( ) function can be utilized in determining a number of extra disks to include with a STaaS device.

In some examples, an input to the distribution function comprises historical information of outcomes for previous requests for additional storage capacity from prior to the determining to produce the storage device. In some examples, an input to the distribution function comprises historical storage usage associated with user identities indicative of users, comprising the user identity indicative of the user, a customer business category associated with the user identity, and a number of employees associated with the user identity.

In some examples, the second cost associated with installing the second number of extra disks is assigned a fixed value. In some examples, the second cost associated with installing the second number of extra disks is parameterized. That is, there can be examples where FC( ) uses a constant cost, and examples where the cost is parameterized.

In some examples, the group of data further comprises third cost data representative of a third cost associated with shipping the second number of extra disks to the user site. In some examples, the group of data further comprises third cost data representative of a third cost associated with unused disks in the storage device. In some examples, the group of data further comprises time data representative of a duration of a contract applicable to the storage device. That is, various other types of information can be used to determine how many extra disks to ship with a STaaS device.

After operation 806, process flow 800 moves to operation 808.

Operation 808 depicts storing an indication of the second number of extra disks. That is, vendor computer 112 of FIG. 1 can store this information and use it in building STaaS device 2 106b (having extra disks 120a-y) per a received order.

After operation 806, process flow 800 moves to 814, where process flow 800 ends.

FIG. 9 illustrates another example process flow 900 for minimizing cost of disk fulfillment, in accordance with an embodiment of this disclosure. In some examples, one or more embodiments of process flow 900 can be implemented by minimizing cost of disk fulfillment component 122 of FIG. 1, or computing environment 1100 of FIG. 11.

It can be appreciated that the operating procedures of process flow 900 are example operating procedures, and that there can be embodiments that implement more or fewer operating procedures than are depicted, or that implement the depicted operating procedures in a different order than as depicted. In some examples, process flow 900 can be implemented in conjunction with one or more embodiments of one or more of process flow 300 of FIG. 3, process flow 400 of FIG. 4, process flow 500 of FIG. 5, process flow 600 of FIG. 6, process flow 800 of FIG. 8 and/or process flow 1000 of FIG. 10.

Process flow 900 begins with 902, and moves to operation 904. Operation 904 depicts obtaining storage device production information representative of a request to produce a storage device, the storage device comprising a number of storage drives based on user input indicating a storage capacity. In some examples, operation 904 can be implemented in a similar manner as operation 804 of FIG. 8.

After operation 904, process flow 900 moves to operation 906.

Operation 906 depicts determining a number of extra disks to include with the storage device when the storage device is produced, the determining of the number of extra disks being based on at least one of, a cost associated with including the number of extra disks, a probability that additional storage capacity beyond the storage capacity will be requested, or a cost associated with installing extra disks after the storage device has been delivered. In some examples, operation 906 can be implemented in a similar manner as operation 806 of FIG. 8.

In some examples, the extra disks are unavailable for usage unless activated by second user input.

In some examples, operation 906 comprises the probability that the additional storage capacity will be requested based on an output from using a neural network model. This can be a neural network model similar to system architecture 200 of FIG. 2. In some examples where a neural network model is used, operation 906 can comprise normalizing the output from the neural network model into a probability distribution representing probabilities that are proportional to exponentials of numbers of the output from the neural network model.

In some examples, the probability that the additional storage capacity beyond the storage capacity will be requested is determined based on respective probabilities that different amounts of additional storage capacity will be requested in different time periods. For example, the different time periods can each be a month, and a prediction can be made as to a likelihood that various amounts of additional storage capacity will be requested in a given month.

After operation 906, process flow 900 moves to operation 908.

Operation 908 depicts storing an indication of the number of extra disks in connection with the storage device production information. In some examples, operation 908 can be implemented in a similar manner as operation 808 of FIG. 8.

After operation 910, process flow 900 moves to 912, where process flow 900 ends.

FIG. 10 illustrates another example process flow 1000 for minimizing cost of disk fulfillment, in accordance with an embodiment of this disclosure. In some examples, one or more embodiments of process flow 1000 can be implemented by minimizing cost of disk fulfillment component 122 of FIG. 1, or computing environment 1100 of FIG. 11.

It can be appreciated that the operating procedures of process flow 1000 are example operating procedures, and that there can be embodiments that implement more or fewer operating procedures than are depicted, or that implement the depicted operating procedures in a different order than as depicted. In some examples, process flow 1000 can be implemented in conjunction with one or more embodiments of one or more of process flow 300 of FIG. 3, process flow 400 of FIG. 4, process flow 500 of FIG. 5, process flow 600 of FIG. 6, process flow 800 of FIG. 8 and/or process flow 900 of FIG. 9.

Process flow 1000 begins with 1002, and moves to operation 1004. Operation 1004 depicts receiving a production request to produce a storage device associated with a customer identity representative of a customer, the storage device comprising a first number of storage drives based on user input associated with the customer identity indicating a requested amount of storage capacity. In some examples, operation 1004 can be implemented in a similar manner as operation 804 of FIG. 8. After operation 1004, process flow 1000 moves to operation 1006.

Operation 1006 depicts determining a second number of extra disks to include with the storage device, the determining of the second number of extra disks being based on at least one factor from a group of factors, the group of factors comprising a first cost of including the second number of extra disks, a probability that additional storage capacity beyond the requested amount of storage capacity will be requested via a future request associated with the customer identity, and a second cost of installing the second number of extra disks after the storage device has been delivered to a customer location associated with the customer identity. In some examples, operation 1006 can be implemented in a similar manner as operation 806 of FIG. 6.

In some examples, the probability that the customer identity will request additional storage capacity beyond the requested amount of storage capacity comprises a distribution function that produces a second probability that the future request for the additional storage capacity will be made during a given time period and that requires d new disks, where a sum of probabilities of an output of the distribution function equals 1. That is, in some examples, $\Sigma_{m=1}^{\infty} \Sigma_{d=1}^{\infty} EP(m, d)=1$ holds.

In some examples. the determining of the second number of extra disks to include with the storage device is based on an expected cost when the second number of extra disks is at least as great as a third number of disks that correspond to a customer upgrade request, and wherein the expected cost is based on a duration of a service contract for the storage device. That is, in some examples, $d_{order} \leq d_{extra}$, so the number of extra disks to include is determined based on a duration of a service contract.

In some examples, the determining of the second number of extra disks to include with the storage device is based on an expected cost when the second number of extra disks is less than a third number of disks that correspond to a customer upgrade request, and wherein the expected cost is based on a shipping cost of shipping and installing disks. That is, in some examples, $d_{order} \leq d_{extra}$, so the number of extra disks to include is determined based on FC, which can indicate a cost of shipping and installing extra disks.

In some examples, the second number of extra disks is determined by enumerating respective costs associated with predefined numbers of extra disks. In some examples, the second number of extra disks is selected based on determining arguments of a minima of functions associated with the enumerating respective costs associated with the predefined numbers of extra disks. That is, a reasonable number of possible extra disks can be iterated over to determine a number of extra disks that corresponds to a predicted minimal cost to the vendor. In some examples, this can be accomplished via argmin.

After operation 1006, process flow 1000 moves to 1008, where process flow 1000 ends.

Example Operating Environment

In order to provide additional context for various embodiments described herein, FIG. 11 and the following discussion are intended to provide a brief, general description of a suitable computing environment 1100 in which the various embodiments of the embodiment described herein can be implemented.

For example, parts of computing environment 1100 can be used to implement one or more embodiments of client computer 104, STaaS device 1 106*a*, STaaS device 2 106*b*, and/or vendor computer 112 of FIG. 1. In some examples, computing environment 1100 can implement one or more embodiments of the process flows of FIGS. 3-6 and/or 8-10 to facilitate minimizing cost of disk fulfillment.

While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 11, the example environment 1100 for implementing various embodiments described herein includes a computer 1102, the computer 1102 including a processing unit 1104, a system memory 1106 and a system bus 1108. The system bus 1108 couples system components including, but not limited to, the system memory 1106 to the processing unit 1104. The processing unit 1104 can be any of various commercially available processors. Dual microprocessors and other multi-processor architectures can also be employed as the processing unit 1104.

The system bus 1108 can be any of several types of bus structure that can further interconnect to a memory bus (with or without a memory controller), a peripheral bus, and a local bus using any of a variety of commercially available bus architectures. The system memory 1106 includes ROM 1110 and RAM 1112. A basic input/output system (BIOS) can be stored in a non-volatile memory such as ROM, erasable programmable read only memory (EPROM), EEPROM, which BIOS contains the basic routines that help to transfer information between elements within the computer 1102, such as during startup. The RAM 1112 can also include a high-speed RAM such as static RAM for caching data.

The computer 1102 further includes an internal hard disk drive (HDD) 1114 (e.g., EIDE, SATA), one or more external storage devices 1116 (e.g., a magnetic floppy disk drive (FDD) 1116, a memory stick or flash drive reader, a memory card reader, etc.) and an optical disk drive 1120 (e.g., which can read or write from a CD-ROM disc, a DVD, a BD, etc.). While the internal HDD 1114 is illustrated as located within the computer 1102, the internal HDD 1114 can also be configured for external use in a suitable chassis (not shown). Additionally, while not shown in environment 1100, a solid state drive (SSD) could be used in addition to, or in place of, an HDD 1114. The HDD 1114, external storage device(s) 1116 and optical disk drive 1120 can be connected to the system bus 1108 by an HDD interface 1124, an external storage interface 1126 and an optical drive interface 1128, respectively. The interface 1124 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1102, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1112, including an operating system 1130, one or more application programs 1132, other program modules 1134 and program data 1136. All or portions of the operating system, applications, modules, and/or data can also be cached in the RAM 1112. The systems and methods described herein can be implemented utilizing various commercially available operating systems or combinations of operating systems.

Computer 1102 can optionally comprise emulation technologies. For example, a hypervisor (not shown) or other intermediary can emulate a hardware environment for operating system 1130, and the emulated hardware can optionally be different from the hardware illustrated in FIG. 11. In such an embodiment, operating system 1130 can comprise one virtual machine (VM) of multiple VMs hosted at computer 1102. Furthermore, operating system 1130 can provide runtime environments, such as the Java runtime environment or the .NET framework, for applications 1132. Runtime environments are consistent execution environments that allow applications 1132 to run on any operating system that includes the runtime environment. Similarly, operating system 1130 can support containers, and applications 1132 can be in the form of containers, which are lightweight, standalone, executable packages of software that include, e.g., code, runtime, system tools, system libraries and settings for an application.

Further, computer 1102 can be enable with a security module, such as a trusted processing module (TPM). For instance, with a TPM, boot components hash next in time boot components, and wait for a match of results to secured values, before loading a next boot component. This process can take place at any layer in the code execution stack of computer 1102, e.g., applied at the application execution level or at the operating system (OS) kernel level, thereby enabling security at any level of code execution.

A user can enter commands and information into the computer 1102 through one or more wired/wireless input devices, e.g., a keyboard 1138, a touch screen 1140, and a pointing device, such as a mouse 1142. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1104 through an input device interface 1144 that can be coupled to the system bus 1108, but can be connected by other interfaces, such as a parallel port, an IEEE 1394 serial port, a game port, a USB port, an IR interface, a BLUETOOTH® interface, etc.

A monitor 1146 or other type of display device can be also connected to the system bus 1108 via an interface, such as a video adapter 1148. In addition to the monitor 1146, a computer typically includes other peripheral output devices (not shown), such as speakers, printers, etc.

The computer 1102 can operate in a networked environment using logical connections via wired and/or wireless communications to one or more remote computers, such as a remote computer(s) 1150. The remote computer(s) 1150 can be a workstation, a server computer, a router, a personal computer, portable computer, microprocessor-based entertainment appliance, a peer device or other common network node, and typically includes many or all of the elements described relative to the computer 1102, although, for purposes of brevity, only a memory/storage device 1152 is illustrated. The logical connections depicted include wired/wireless connectivity to a local area network (LAN) 1154 and/or larger networks, e.g., a wide area network (WAN) 1156. Such LAN and WAN networking environments are commonplace in offices and companies, and facilitate enterprise-wide computer networks, such as intranets, all of which can connect to a global communications network, e.g., the Internet.

When used in a LAN networking environment, the computer 1102 can be connected to the local network 1154 through a wired and/or wireless communication network interface or adapter 1158. The adapter 1158 can facilitate wired or wireless communication to the LAN 1154, which can also include a wireless access point (AP) disposed thereon for communicating with the adapter 1158 in a wireless mode.

When used in a WAN networking environment, the computer 1102 can include a modem 1160 or can be connected to a communications server on the WAN 1156 via other means for establishing communications over the WAN 1156, such as by way of the Internet. The modem 1160, which can be internal or external and a wired or wireless device, can be connected to the system bus 1108 via the input device interface 1144. In a networked environment, program modules depicted relative to the computer 1102 or portions thereof, can be stored in the remote memory/storage device 1152. It will be appreciated that the network connections shown are example and other means of establishing a communications link between the computers can be used.

When used in either a LAN or WAN networking environment, the computer 1102 can access cloud storage systems or other network-based storage systems in addition to, or in place of, external storage devices 1116 as described above. Generally, a connection between the computer 1102 and a cloud storage system can be established over a LAN 1154 or WAN 1156 e.g., by the adapter 1158 or modem 1160, respectively. Upon connecting the computer 1102 to an associated cloud storage system, the external storage interface 1126 can, with the aid of the adapter 1158 and/or modem 1160, manage storage provided by the cloud storage system as it would other types of external storage. For instance, the external storage interface 1126 can be configured to provide access to cloud storage sources as if those sources were physically connected to the computer 1102.

The computer 1102 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

CONCLUSION

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory in a single machine or multiple machines. Additionally, a processor can refer to an integrated circuit, a state machine, an application specific integrated circuit (ASIC), a digital signal processor (DSP), a programmable gate array (PGA) including a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units. One or more processors can be utilized in supporting a virtualized computing environment. The virtualized computing environment may support one or more virtual machines representing computers, servers, or other computing devices. In such virtualized virtual machines, components such as processors and storage devices may be virtualized or logically represented. For instance, when a processor executes instructions to perform "operations", this could include the processor performing the operations directly and/or facilitating, directing, or cooperating with another device or component to perform the operations.

In the subject specification, terms such as "data store," "data storage," "database," "cache," and substantially any other information storage component relevant to operation and functionality of a component, refer to "memory components," or entities embodied in a "memory" or components comprising the memory. It will be appreciated that the memory components, or computer-readable storage media, described herein can be either volatile memory or nonvolatile memory, or can include both volatile and nonvolatile memory. By way of illustration, and not limitation, nonvolatile memory can include ROM, programmable ROM (PROM), EPROM, EEPROM, or flash memory. Volatile memory can include RAM, which acts as external cache memory. By way of illustration and not limitation, RAM can be available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

The illustrated embodiments of the disclosure can be practiced in distributed computing environments where certain tasks are performed by remote processing devices that are linked through a communications network. In a distributed computing environment, program modules can be located in both local and remote memory storage devices.

The systems and processes described above can be embodied within hardware, such as a single integrated circuit (IC) chip, multiple ICs, an ASIC, or the like. Further, the order in which some or all of the process blocks appear in each process should not be deemed limiting. Rather, it should be understood that some of the process blocks can be executed in a variety of orders that are not all of which may be explicitly illustrated herein.

As used in this application, the terms "component," "module," "system," "interface," "cluster," "server," "node," or the like are generally intended to refer to a computer-related entity, either hardware, a combination of hardware and software, software, or software in execution or an entity related to an operational machine with one or more specific functionalities. For example, a component can be, but is not limited to being, a process running on a processor, a processor, an object, an executable, a thread of execution, computer-executable instruction(s), a program, and/or a computer. By way of illustration, both an application running on a controller and the controller can be a component. One or more components may reside within a process and/or thread of execution and a component may be localized on one computer and/or distributed between two or more computers. As another example, an interface can include input/output (I/O) components as well as associated processor, application, and/or API components.

Further, the various embodiments can be implemented as a method, apparatus, or article of manufacture using standard programming and/or engineering techniques to produce software, firmware, hardware, or any combination thereof to control a computer to implement one or more embodiments of the disclosed subject matter. An article of manufacture can encompass a computer program accessible from any computer-readable device or computer-readable storage/communications media. For example, computer readable storage media can include but are not limited to magnetic storage devices (e.g., hard disk, floppy disk, magnetic strips . . . ), optical discs (e.g., CD, DVD . . . ), smart cards, and flash memory devices (e.g., card, stick, key drive . . . ). Of course, those skilled in the art will recognize many modifications can be made to this configuration without departing from the scope or spirit of the various embodiments.

In addition, the word "example" or "exemplary" is used herein to mean serving as an example, instance, or illustration. Any embodiment or design described herein as "exemplary" is not necessarily to be construed as preferred or advantageous over other embodiments or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

What has been described above includes examples of the present specification. It is, of course, not possible to describe every conceivable combination of components or methods for purposes of describing the present specification, but one of ordinary skill in the art may recognize that many further combinations and permutations of the present specification are possible. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system, comprising:
   a processor; and
   a memory that stores executable instructions that, when executed by the processor, facilitate performance of operations, comprising:
      determining to produce a storage device for a user identity indicative of a user, the storage device to be installed at a user site associated with the user identity after production, the storage device comprising a first number of storage drives based on a specified storage capacity indicated by user input associated with the user identity;
      determining a second number of extra disks to include with the storage device as part of the production, the extra disks enabling further storage capacity for the storage device beyond the specified storage capacity, the determining of the second number of the extra disks being based on a combination of
         first cost data representative of a first cost associated with including the second number of the extra disks,
         probability data representative of a probability that the further storage capacity beyond the specified storage capacity will be requested during a defined time period after the production, and
         second cost data representative of a second cost associated with installing the second number of the extra disks after the storage device has been delivered to the user site, wherein the user site is distinct from a physical location at which the storage device is produced; and
      storing an indication of the second number of the extra disks.

2. The system of claim 1, wherein the probability is a first probability, and wherein the operations further comprise:
   determining the first probability that the further storage capacity will be requested based on a distribution function that outputs a second probability that an expansion request will be filled at a particular time period, variable as a first parameter of the distribution function, involving a number of new disks variable as a second parameter of the distribution function.

3. The system of claim 2, wherein an input to the distribution function comprises historical information of outcomes for previous requests for additional storage capacity from prior to the determining to produce the storage device.

4. The system of claim 2, wherein an input to the distribution function comprises historical storage usage associated with user identities indicative of users, comprising the user identity indicative of the user, a customer business category associated with the user identity, and a number of employees associated with the user identity.

5. The system of claim 1, wherein the second cost associated with installing the second number of the extra disks is assigned a fixed value.

6. The system of claim 1, wherein the second cost associated with installing the second number of the extra disks is parameterized.

7. The system of claim 1, wherein the group of data further comprises:
third cost data representative of a third cost associated with shipping the second number of the extra disks to the user site.

8. The system of claim 1, wherein the group of data further comprises:
third cost data representative of a third cost associated with unused disks in the storage device.

9. The system of claim 1, wherein the group of data further comprises:
time data representative of a duration of a contract applicable to the storage device.

10. A method, comprising:
obtaining, by a system comprising a processor, storage device production information representative of a request to produce a storage device, the storage device comprising a number of storage drives based on user input indicating a storage capacity;
determining, by the system, a number of extra disks to include with the storage device when the storage device is produced, the determining of the number of extra disks being based on a combination of,
a cost associated with including the number of extra disks,
a probability that additional storage capacity beyond the storage capacity will be requested, or
a cost associated with installing extra disks after the storage device has been delivered to a user site that is distinct from a physical location at which the storage device is produced; and
storing, by the system, an indication of the number of the extra disks in connection with the storage device production information.

11. The method of claim 10, wherein the user input is first user input, and wherein the extra disks are unavailable for usage unless activated by second user input.

12. The method of claim 10, further comprising:
determining, by the system, the probability that the additional storage capacity will be requested based on an output from using a neural network model.

13. The method of claim 12, further comprising:
normalizing, by the system, the output from the neural network model into a probability distribution representing probabilities that are proportional to exponentials of numbers of the output from the neural network model.

14. The method of claim 10, wherein the probability that the additional storage capacity beyond the storage capacity will be requested is determined based on respective probabilities that different amounts of additional storage capacity will be requested in different time periods.

15. A non-transitory computer-readable medium comprising instructions that, in response to execution, cause a system comprising a processor to perform operations, comprising:

receiving a production request to produce a storage device associated with a customer identity representative of a customer, the storage device comprising a first number of storage drives based on user input associated with the customer identity indicating a requested amount of storage capacity; and
determining a second number of extra disks to include with the storage device, the determining of the second number of extra disks being based on a combination of,
a first cost of including the second number of extra disks,
a probability that additional storage capacity beyond the requested amount of storage capacity will be requested via a future request associated with the customer identity, and
a second cost of installing the second number of extra disks after the storage device has been delivered to a customer location associated with the customer identity, wherein the customer location is geographically distinct from a physical location at which the storage device is produced.

16. The non-transitory computer-readable medium of claim 15, wherein the probability that the customer identity will request the additional storage capacity beyond the requested amount of storage capacity comprises a distribution function that produces a second probability that the future request for the additional storage capacity will be made during a given time period and that requires d new disks, where a sum of probabilities of an output of the distribution function equals 1.

17. The non-transitory computer-readable medium of claim 15, wherein the determining of the second number of extra disks to include with the storage device is based on an expected cost when the second number of extra disks is at least as great as a third number of disks that correspond to a customer upgrade request, and wherein the expected cost is based on a duration of a service contract for the storage device.

18. The non-transitory computer-readable medium of claim 15, wherein the determining of the second number of extra disks to include with the storage device is based on an expected cost when the second number of extra disks is less than a third number of disks that correspond to a customer upgrade request, and wherein the expected cost is based on a shipping cost of shipping and installing disks.

19. The non-transitory computer-readable medium of claim 15, wherein the second number of extra disks is determined by enumerating respective costs associated with predefined numbers of extra disks.

20. The non-transitory computer-readable medium of claim 19, wherein the second number of extra disks is selected based on determining arguments of a minima of functions associated with the enumerating of the respective costs associated with the predefined numbers of extra disks.

* * * * *